United States Patent Office 2,728,534
Patented Dec. 27, 1955

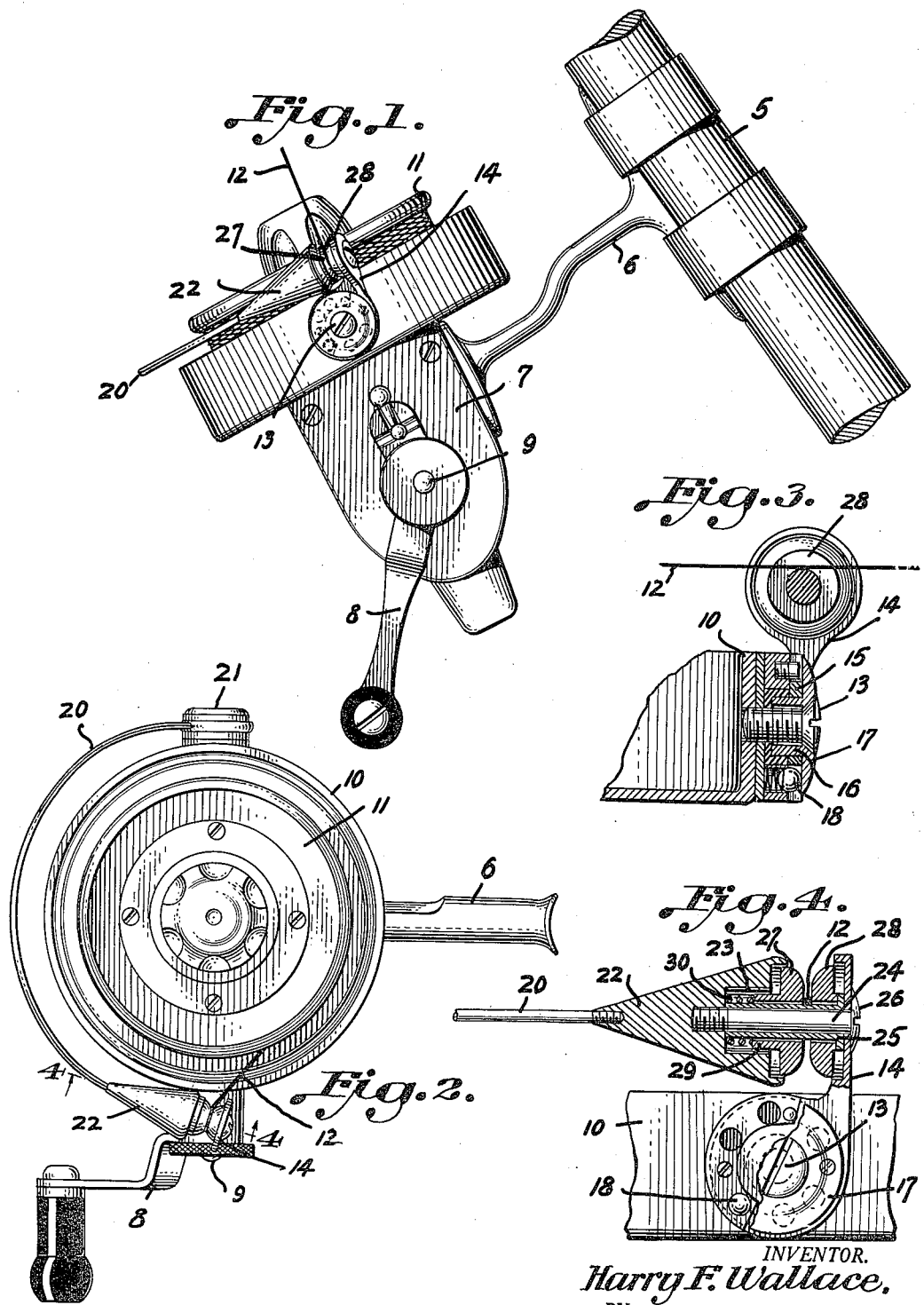

2,728,534

SPINNING REEL ATTACHMENT

Harry F. Wallace, Bethlehem, Pa.

Application February 11, 1954, Serial No. 409,599

6 Claims. (Cl. 242—84.1)

This invention pertains generally to fishing reels and particularly to that type of reel wherein the line is unwound from the end of the reel without spinning or rotating the reel itself.

In the use of the spinning type fishing reel, its efficiency and advantages are somewhat impaired because of line twist which occurs in reeling in the line after a cast, as well as the presence of loose coils in the rim occurring during the rewind operation.

The primary object of my invention is to provide an attachment for use in connection with standard or well known types of spinning type fishing reels which operates upon the line during the rewind operation to obviate the presence of twists in the line, and which also assures an even tension on the line during the coiling operation to thus prevent the presence of loose coils thereon.

A further object of the invention is to provide an attachment for the purposes generally set forth which may be effectively used in connection with bailwire, manual or arm pickups now in use in connection with reels of the spinning type character well known.

A further and particular object of the invention is to provide an automatic tensioning device of extremely simple construction, which may be readily applied to any of the types of pickups mentioned above, which is simple and yet efficient in its operation, which may be readily adjusted to lines of various types, sizes or diameters, which may be accurately adjusted to bring about that tension desired by a particular user, which has its parts so constructed and assembled as to minimize the opportunity for wear, breakage or derangement, and which will prove highly effective in carrying out the desired ends.

With the foregoing objects in view, together with others which will appear as the description proceeds, the invention resides in the novel construction, combination and arrangement of parts, all as will be described more fully hereinafter, illustrated in the drawings, and particularly pointed out in the claims.

In the drawings:

Fig. 1 is a side elevation of a portion of a fishing rod and showing as applied thereto in side elevation a spinning type reel of conventional form and of the bailwire type, Fig. 2 is a top plan view of the reel as shown in Fig. 1, Fig. 3 is a fragmentary transverse sectional view taken through a portion of the reel structure and illustrating the line tensioning device applied thereto, and Fig. 4 is a transverse sectional view taken substantially upon line 4—4 of Fig. 2.

Referring now more particularly to the drawing, 5 indicates a fishing rod which has attached thereto one end of the post or connecting arm 6 which carries the body of the reel structure represented at 7. In this particular type of reel, it is understood that the same is suspended from the underside of the fishing rod in substantially the manner shown in Fig. 1. Inasmuch as the mechanism by which the reel itself is operated forms no part of the present invention, no description thereof is deemed necessary, except that the mechanism housed within the body or frame of the reel structure is operated by rotating the crank 8 upon its shaft 9.

The drum which rotates upon operation of the crank 8 is indicated at 10, and the line spool which remains stationary within the drum is indicated at 11, it being understood that in the reeling process the spool 11 reciprocates endwise within the spool while the latter rotates around the spool carrying with it the fish line indicated at 12 in winding and leveling the same upon the spool.

Pivoted as at 13 upon the exterior of the drum 10 is the pickup arm 14. This arm is formed at one end with an apertured disk 15 mounted for oscillation upon the sleeve 16 projecting inwardly from the plate 17 held fast to the drum 10 by the screw 13. This particular mounting of the pickup arm permits limited oscillations thereof tangentially of the drum 10, and the said arm may be held in its various positions of adjustments by means of the spring pressed balls 18 engaging in recesses or openings 19 in the disk 15.

The bailwire used in connection with this type of reel is indicated at 20 and constitutes the pickup to operate upon the line in both casting and rewind operations. This bailwire is of arcuate form as shown more particularly in Fig. 2, being pivoted at its ends at diametrically opposite points upon the drum 10, one of the connections being to the pickup arm 14 and the other to the pivot member indicated generally at 21.

The tensioning device of my invention is associated with the bailwire at its connection with the pickup arm 14. The head member 22 secured to an end of the bailwire is provided in its base with a circular recess or channel 23 axially aligned with the end of the bailwire. Arranged centrally and axially within this channel or recess is a shaft 24 around which engages a sleeve 25; the inner end of the shaft 24 being threadedly engaged as shown in the head 22, and the outer end of the shaft being headed as at 26 and provided with a kerf to permit of the application thereto of a screw driver or other tool to bring about rotary movement of the shaft when desired.

Rotatably mounted upon the sleeve 25 are cooperating friction heads 27 and 28. The head 27 is provided upon its inner surface with an annulus 29 disposed within the channel 23 and engaged with one end of an expansion spring 30 seated at its opposite end in the base of the said channel. The companion friction head 28 has its inner end seated within the pickup arm 14. The cooperating faces of the friction heads 27—28 are rounded as shown, and the compression spring 30 tends normally to maintain these cooperating faces in substantial engagement with one another. It is apparent, however, that by adjusting the supporting shaft 24, the degree of tension of the spring 30 may be governed to bring about the degree of pressure desired between the cooperating faces of the friction heads 27—28.

With the spinning reel equipped with the tension device, the line leading from the spool 11 enters the space between the friction heads 27 and is gripped therein by these heads. After a cast and in rewinding the line, the drum rotates about the stationary spool in the manner well known, the line 12 being held at all times in frictional engagement between the cooperating heads so as to exert a desired tension on the line during the rewinding operation. As has been before stated, the degree of this tension will be determined by the operator and may be accomplished by proper manipulation of the supporting shaft 24. This tension remains constant, as the line is maintained between the friction heads throughout the various oscillatory operations of the bailwire during the rewind operation, and this tension will insure an even and smooth winding of the line upon the spool 11.

With the use of the tensioning device here described, it will be desirable to make such adjustments as will produce sufficient tension to prevent any tendency toward loose winding on the spool, and on the forward cast of the line the pulling of a series of loops from the spool at one time will be prevented. Thus, the opportunity for tangle in the guides is overcome, and in the rewind operation not only is the line evenly tensioned when being applied to the spool, but danger of line twist during this operation is prevented.

A common objection to conventional types of spinning reels now in use is that roll and twist frequently occurs over each overlapped coil on the spool when the line is retrieved. The construction and arrangement of the friction heads or disks on the present pick-up arm prevent the line from rolling or twisting while retrieving the line with the drum and arm rotating around a reciprocating fixed spool as will be readily understood. The adjustments for the friction heads when once set need no further adjustments for tension.

I claim:

1. In a spinning reel structure, a rotatable drum, a spool within and disposed axially of said drum, a line on said spool passing over the outer rim thereof, and a pickup arm secured to said drum, a shaft rotatably mounted on said pickup arm and disposed tangentially of said drum, a pair of friction heads rotatably mounted on said shaft, spring means urging one of said heads into contact with the other of said heads, and said line passing from said spool between the coacting faces of said friction heads.

2. In a spinning reel structure, a rotatable drum, a spool within and disposed axially of said drum, a line on said spool passing over the outer rim thereof, and a pickup arm secured to said drum, a shaft rotatably secured at one end to said arm and disposed tangentially of said drum, a head affixed to the opposite end of said shaft, a pair of friction heads slidably and rotatably carried by said shaft, and a spring forcing one of said heads into frictional engagement with the other of said heads, said line passing between the abutting faces of said friction heads.

3. In a spinning reel structure, a rotatable drum, a spool within and disposed axially of said drum, a line on said spool passing over the outer rim thereof, and a pickup arm secured to said drum; a shaft rotatably mounted at one end in said arm and disposed tangentially of said drum, a head threadedly engaged with the opposite end of said shaft, said head having a recess concentric with said shaft, a pair of friction heads rotatably and slidably mounted upon said shaft, and a spring disposed within said recess and engaging one of said heads to force the same into frictional contact with the other of said heads, said line passing between the adjacent faces of said friction heads.

4. In a spinning reel structure, a rotatable drum, a spool within and disposed axially of said drum, a line on said spool passing over the outer rim thereof, and a pickup arm secured to said drum; a shaft rotatably mounted in said pickup arm and disposed tangentially to said drum, a bailwire pivotally secured to the outer surface of said drum diametrically opposite to said pickup arm, a head on the opposite end of said bailwire, said head having an annular recess in its end, a shaft rotatably mounted in one end in said pickup arm and extending axially into said head, a pair of friction heads rotatably and slidably mounted on said shaft, and a spring in said bailwire head engaging one of said friction heads and forcing it into engagement with the other head, said line passing between the coacting faces of said friction heads.

5. In a spinning reel structure, a rotatable drum, a spool within and disposed axially of said drum, a line on said spool passing over the outer rim thereof, and a pickup arm pivoted at one end to the exterior of said drum, a shaft mounted in the opposite end of said arm and at right angles to the pivotal connection of the arm with said drum, a pair of friction heads carried by said shaft, spring means urging one of said heads into frictional contact with the other of said heads, and said line passing from said spool between the coacting faces of said friction heads.

6. In a spinning reel structure, a rotatable drum, a spool within and disposed axially of said drum, a line on said spool passing over the outer rim thereof, and a pickup arm pivoted at one end to the exterior of said drum and having its opposite end normally disposed above the said rim, a shaft rotatably secured in one end in said pickup arm and disposed at right angles to the pivotal connection of the opposite end of said arm with said drum, a head threadedly engaged with the opposite end of said shaft, said head having an annular channel therein concentric with said shaft, a friction head rotatably mounted upon said shaft adjacent said arm, a second friction head rotatably mounted on said shaft, a sleeve extending from said second friction head into said annular channel, and a spring seated in said channel and engaged with said sleeve to urge said second friction head into engagement with the first friction head, said line passing between the adjacent faces of said friction heads.

References Cited in the file of this patent
UNITED STATES PATENTS

| | | |
|---|---|---|
| 2,648,505 | Mauborgne | Aug. 11, 1953 |
| 2,672,301 | Shelburne | Mar. 16, 1954 |